Patented Jan. 2, 1945

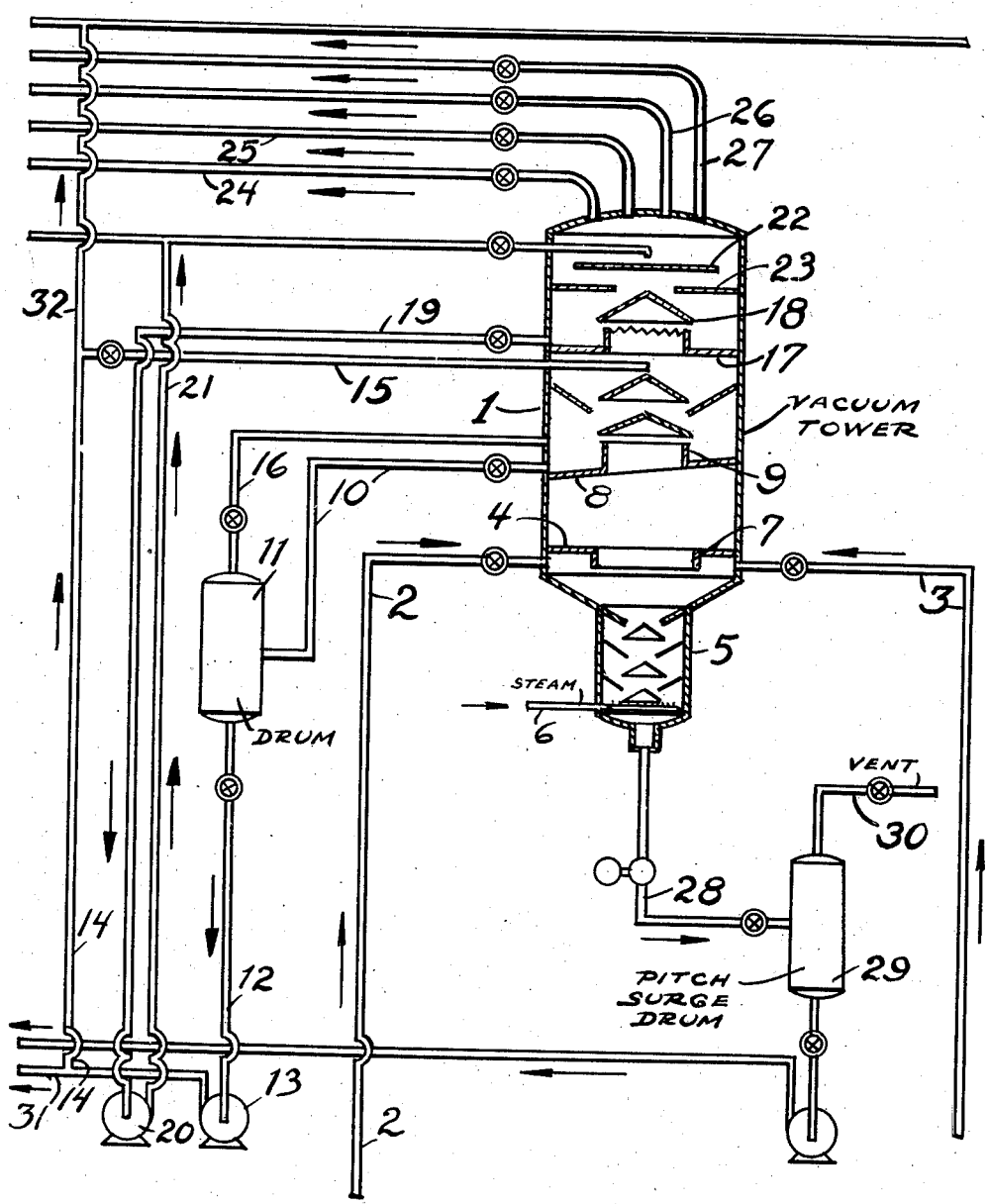

2,366,551

UNITED STATES PATENT OFFICE 2,366,551

APPARATUS FOR MANUFACTURE OF HIGH MELTING POINT BITUMEN

John W. Packie, Green Village, and Raymond E. Bittner, Phillipsburg, N. J., assignors to Standard Oil Development Company, a corporation of Delaware Application September 5, 1942, Serial No. 457,468

1 Claim. (Cl. 196—114)

This invention relates to improvement in equipment for separating liquid and vapors at high temperatures and high vacuum and particularly for separating bitumen of high melting points from petroleum hydrocarbon oils without any substantial cracking of the products.

Bitumen having softening points above 200° F. are very difficult to separate from the oil in which they are found. There are certain bitumen oils obtained in Venezuela that contain bitumen having softening points ranging from 200 to 350° F. It is necessary to separate these bituminous substances from the oil without any substantial cracking, as cracking greatly augments the quantity of vapors to be handled by the evacuating equipment and makes the maintenance of a low absolute pressure in the separating zone virtually impossible.

An object of this invention is to effect a separation by vacuum distillation of the bituminous substances having softening points above 200° F. from the oil fraction in which they are normally found.

In order to obtain high melting point pitch bottoms from relatively heavy charge stocks, the low boiling fractions must be separated from the bitumen at relatively high temperatures and low absolute pressures. The vapor fractions separated from the bitumen in the separating chamber contain some high boiling fractions and also contain some entrained bitumen. These vapors must be scrubbed with liquid to recover the entrained bitumen and to improve the color and carbon content of the recovered relatively low boiling oil fractions. However, the vapors cannot be cooled substantially as this would result in condensation of some of the low boiling material which, if permitted to combine with the liquid bitumen in the base of the separating chamber, would result in the dilution of this product with a consequent reduction in the melting point. Accordingly, with normal separator tower construction in which the refluxing liquid introduced in the top of the tower flows down the tower and if not revaporized will finally be admixed with the liquid fractions in the base of the tower, the quantity of refluxing liquid must be small in relation to the quantity of overhead vapors. With this small quantity of liquid passing over the separating devices in the tower, a considerable coke deposit takes place on the surfaces of the separating devices. The vapor passages soon become completely closed off with this coke deposit and this results in a high absolute pressure in the separating zone. This is especially true if bubble cap trays are used in the tower. The object of this invention is to eliminate these difficulties. This is accomplished by using an internal construction of baffle plates and other separating devices which do not result in restricted passages for the ascending vapors. In addition, the deposition of coke on the baffles is prevented by maintaining a high rate of liquid flow over the surfaces and a low hold-up time of liquid on the surfaces.

The various features and novelties of the invention will be fully understood on reading the following description with reference to the accompanying drawing.

A Venezuelan crude containing the high softening point asphalt is first subjected to distillation and/or viscosity breaking and distillation to separate the oil fractions boiling at low temperatures; that is, boiling below 500° F. to 600° F. The residual oil is then passed to a vacuum tower 1 by means of pipes 2 and 3, after being heated while confined in a narrow stream in a furnace. This residual oil is introduced into the lower part of vacuum tower 1 beneath plate 4 where a temperature of about 775° F. and a pressure of 70 mm. is maintained. Superheated steam may be introduced into the residual oil as it is being passed through the heating coil. The bottom section of the tower is provided with a series of baffle plates and also maintained at the desired temperature by means of superheated steam introduced through pipe 6. The volatile fractions of the residual oil pass upwardly through the opening 7 provided with downwardly extending flange baffles in plate 4 and opening 9 in drawoff pan 8. Opening 9 is provided with upwardly extending flange baffles. Pan 8 is slanted and any liquid oil fraction entering pan 8 is removed by means of pipe 10 and passed to heavy recirculating drum 11 where by means of pipe 12 and pump 13 it is passed to pipes 14 and 15 to the vacuum tower 1 above drawoff pan 8. Any volatile fractions separated in heavy recirculating drum 11 may be returned to the vacuum tower 1 above drawoff plan 8 by means of pipe 16. A series of baffle plates is provided in vacuum tower 1 above pan 8 and beneath an upper pan 17. The condensate in pan 17 is removed through pipe 19, passed through light recirculating pumps 20 and returned to the upper part of the vacuum tower 1 by means of pipe 21. The temperature maintained in the upper part of vacuum tower 1 is about 700° F. while that in the lower part of the tower is 775° F. Condensate formed in the tower by reason of the cooling of the ascending vapors together with the entrained bitumen removed from the vapors are collected in drum 11. This heavy high viscosity material may be removed from the system through line 31 or they may be recycled back through the heating coil and into the separating chamber through line 32. In the latter case, this recycled material is separated into a bitumen fraction and an oil fraction, as is the original charge. This results in maximum yield of the desired bitumen from the feed stock. Trays 22 and 23 are also provided in the upper part of the vacuum tower 1. These are preferably perforated trays so that the liquid sprays down through the vapor space, thereby scrubbing the ascending vapors. Vapors are removed from this tower by means of vapor lines 24, 25, 26, and 27. Cooling in the tower is accomplished by returning to tray 22 some of the condensed overhead vapors. By maintaining pressures not over 70 mm. and temperatures ranging from 700° to 775° F., a good separation of the bituminous material without substantial cracking is obtained. The finished product of bitumen is removed from the bottom section of vacuum tower 1 by means of pipe 28 and after passing through a pitch surge drum 29 is passed to storage. The vapors in pitch surge drum 29 are removed by means of pipe 30.

We claim:

An evaporator for low vacuum flashing of bituminous oil to produce high melting point bitumen, comprising a shell, means for introducing the oil into the bottom of the shell at a temperature of about 750° F., means for maintaining a pressure within the shell of about 70 millimeters, a lower wash system for vapors from the bitumen material flowing upwardly through the shell and comprising a sloping annular tray with an upwardly extending flange on its inner periphery, a conduit leading from the bottom of the tray through the shell to a separator and returning to a baffle above the tray for circulation of wash liquid, an annular plate with depending flange around its inner periphery between the inlet for oil and the tray, an upper wash system comprising a horizontal annular tray with upwardly extending flange on its inner periphery, a conduit leading from the tray through the shell and returning to a baffle above the tray to circulate wash liquid whereby the upwardly ascending vapors are washed to remove bituminous material, conduits leading from the top of the shell to withdraw the washed vapors, a chamber of reduced diameter depending from the bottom of the shell and provided with baffles over which the stripped bitumen flows, a steam inlet at the bottom of the chamber for maintaining the temperature within the chamber and for steam washing the stripped bituminous material descending through the chamber, and a conduit extending from the bottom of the chamber for leading the stripped bituminous material from the shell whereby separation of the bituminous material from the oil is effected without substantial cracking and the passages through the shell are maintained open.

JOHN W. PACKIE.
RAYMOND E. BITTNER.